(12) United States Patent
Zheng (10) Patent No.: US 8,088,295 B2
(45) Date of Patent: Jan. 3, 2012

(54) DIAMOND-LIKE CARBON (DLC) HARDMASK AND METHODS OF FABRICATION USING SAME

(75) Inventor: Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 937 days.

(21) Appl. No.: 12/018,084

(22) Filed: Jan. 22, 2008

(65) Prior Publication Data

US 2009/0184091 A1 Jul. 23, 2009

(51) Int. Cl.
*B44C 1/22* (2006.01)

(52) U.S. Cl. .............................. 216/22; 216/49; 438/722

(58) Field of Classification Search .................... 216/22, 216/62, 65, 77, 78, 49, 75; 438/717, 722, 438/754
See application file for complete search history.

(56) References Cited

U.S. PATENT DOCUMENTS

| | | | |
|---|---|---|---|
| 5,490,027 A | 2/1996 | Hamilton et al. | 360/104 |
| 5,557,488 A | 9/1996 | Hamilton et al. | 360/104 |
| 6,120,694 A * | 9/2000 | Kasamatsu et al. | 216/22 |
| 6,316,329 B1 | 11/2001 | Hirota et al. | 438/424 |
| 6,753,042 B1 | 6/2004 | Bakounine et al. | 427/526 |
| 7,012,784 B2 | 3/2006 | Sasaki | 360/126 |
| 7,185,416 B2 | 3/2007 | Sasaki et al. | 29/603.12 |
| 7,205,164 B1 * | 4/2007 | Geha et al. | 438/3 |
| 7,233,554 B2 | 6/2007 | Onagi et al. | 369/53.18 |
| 2001/0005139 A1 * | 6/2001 | Adachi et al. | 324/671 |
| 2006/0234483 A1 | 10/2006 | Araki et al. | 438/551 |
| 2006/0286292 A1 | 12/2006 | Jiang et al. | 427/127 |
| 2007/0058500 A1 | 3/2007 | Onagi et al. | 369/30.65 |
| 2007/0115584 A1 | 5/2007 | Balamane et al. | 360/126 |
| 2007/0217085 A1 | 9/2007 | Gill | 360/324.12 |
| 2007/0231473 A1 * | 10/2007 | Suwa et al. | 427/130 |
| 2008/0038898 A1 * | 2/2008 | Williams | 438/413 |

* cited by examiner

*Primary Examiner* — Lan Vinh
(74) *Attorney, Agent, or Firm* — Zilka-Kotab, PC (57) ABSTRACT

A method according to one embodiment comprises forming a thin film layer; forming a hardmask layer above the thin film layer, the hardmask layer comprising laminated layers of diamond-like carbon; removing a portion of the hardmask layer; and removing a portion of the thin film layer that is unprotected by the hardmask layer. A method according to another embodiment comprises forming a thin film layer; forming a patterned hardmask layer above the thin film layer, the hardmask layer comprising laminated layers of diamond-like carbon; and implanting a material into a portion of the thin film layer that is unprotected by the patterned hardmask layer. Additional methods are disclosed.

24 Claims, 10 Drawing Sheets

FIG. 15

DIAMOND-LIKE CARBON (DLC) HARDMASK AND METHODS OF FABRICATION USING SAME

FIELD OF THE INVENTION

The present invention relates to thin film processing, and more particularly, this invention relates to use of a diamond-like carbon (DLC) hardmask during fabrication of thin film structures such as writer pole tips.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

SUMMARY OF THE INVENTION

A method according to one embodiment comprises forming a thin film layer; forming a hardmask layer above the thin film layer, the hardmask layer comprising laminated layers of diamond-like carbon; removing a portion of the hardmask layer; and removing a portion of the thin film layer that is unprotected by the hardmask layer.

A method according to another embodiment comprises forming a thin film layer; forming a patterned hardmask layer above the thin film layer, the hardmask layer comprising laminated layers of diamond-like carbon; and implanting a material into a portion of the thin film layer that is unprotected by the patterned hardmask layer.

A method according to yet another embodiment comprises forming a thin film pole layer; forming a patterned hardmask layer above the thin film layer, the hardmask layer comprising laminated layers of diamond-like carbon; and removing a portion of the thin film pole layer that is unprotected by the hardmask layer for defining a pole such that sidewalk of a remaining portion of the thin film layer taper together at an end thereof away from the hardmask layer.

A method according to yet another embodiment comprises forming a thin film pole layer; forming a patterned hardmask layer above the thin film layer, the hardmask layer comprising laminated layers of diamond-like carbon; removing a portion of the thin film pole layer that is unprotected by the hardmask layer for defining a pole such that side wails of a remaining portion of the thin film layer taper together at an end thereof away from the hardmask layer, wherein an angle of taper relative to a plane of deposition of the thin film layer is greater than about 70 degrees; and removing the hard mask layer.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of thin film fabrication methods, as well as resultant structures formed therefrom including components for magnetic storage systems.

While much of the following description will describe fabrication of a pole for a perpendicular magnetic writer, it should be understood that this is done by way of example only, and the teachings herein have broad application to thin film processing in all areas.

In one general embodiment, a method is provided for fabricating a magnetic structure using a diamond-like carbon hardmask. In use, a thin film layer is formed. Additionally, a hardmask layer is formed above the thin film layer, the hardmask layer comprising laminated layers of diamond-like carbon. Further, a portion of the hardmask layer is removed. Still yet, a portion of the thin film layer that is unprotected by the hardmask layer is removed.

In another general embodiment, a method is provided for fabricating a magnetic structure using a diamond-like carbon hardmask. In use, a thin film layer is formed. Additionally, patterned hardmask layer is formed above the thin film layer, the hardmask layer comprising laminated layers of diamond-like carbon. Further, a material is implanted into a portion of the thin film layer that is unprotected by the patterned hardmask layer.

In another general embodiment, a method is provided for fabricating a magnetic structure using a diamond-like carbon hardmask. In use, a thin film pole layer is formed. Additionally, a patterned hardmask layer is formed above the thin film layer, the hardmask layer comprising laminated layers of diamond-like carbon. Further, a portion of the thin film pole layer that is unprotected by the hardmask layer is removed for defining a pole such that side walls of a remaining portion of the thin film layer taper together at an end thereof away from the hardmask layer.

In still another general embodiment, a method is provided for fabricating a magnetic structure using a diamond-like carbon hardmask. In use, a thin film pole layer is formed. Additionally, a patterned hardmask layer is formed above the thin film, layer, the hardmask layer comprising laminated layers of diamond-like carbon. Further, a portion of the thin film pole layer that is unprotected by the hardmask layer is removed for defining a pole such that sidewalls of a remaining portion of the thin film layer taper together at an end thereof away from the hardmask layer, wherein an angle of taper relative to a plane of deposition of the thin film layer is greater than about 70 degrees. Still yet, the hard mask layer is removed.

Figure 1:
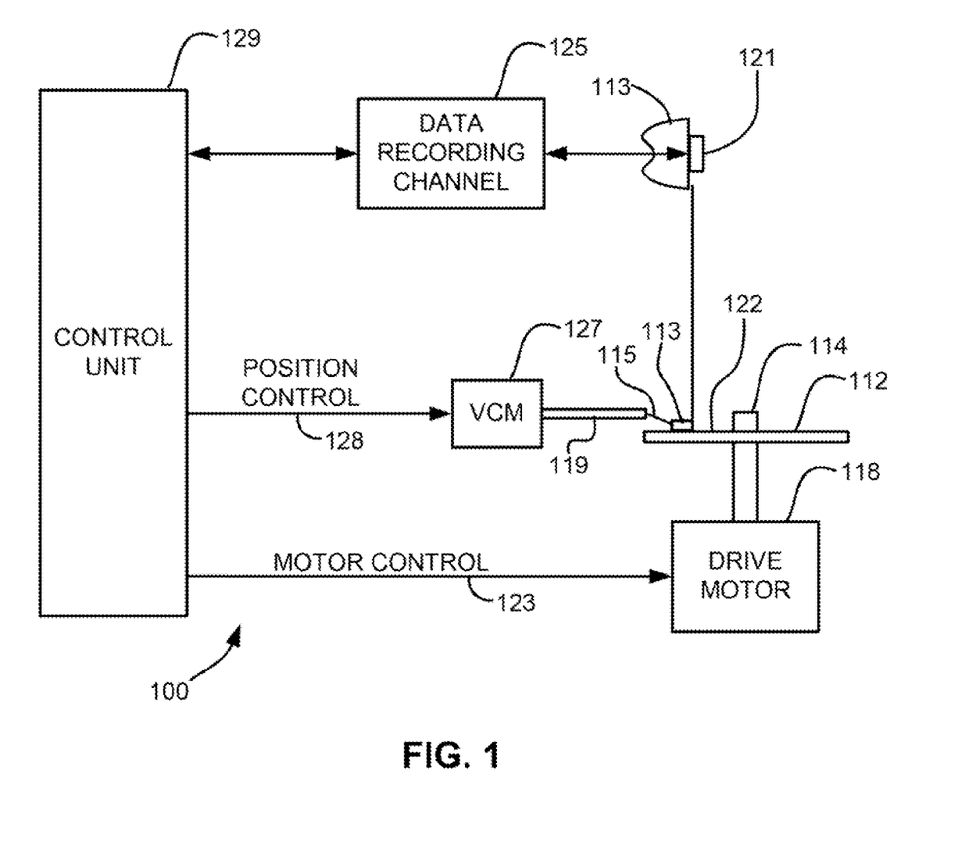
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Figure 2A:
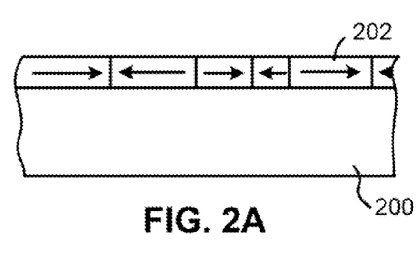
FIG. 2A is a schematic representation in section of a recording medium utilizing a longitudinal recording format.
Figure 3A:
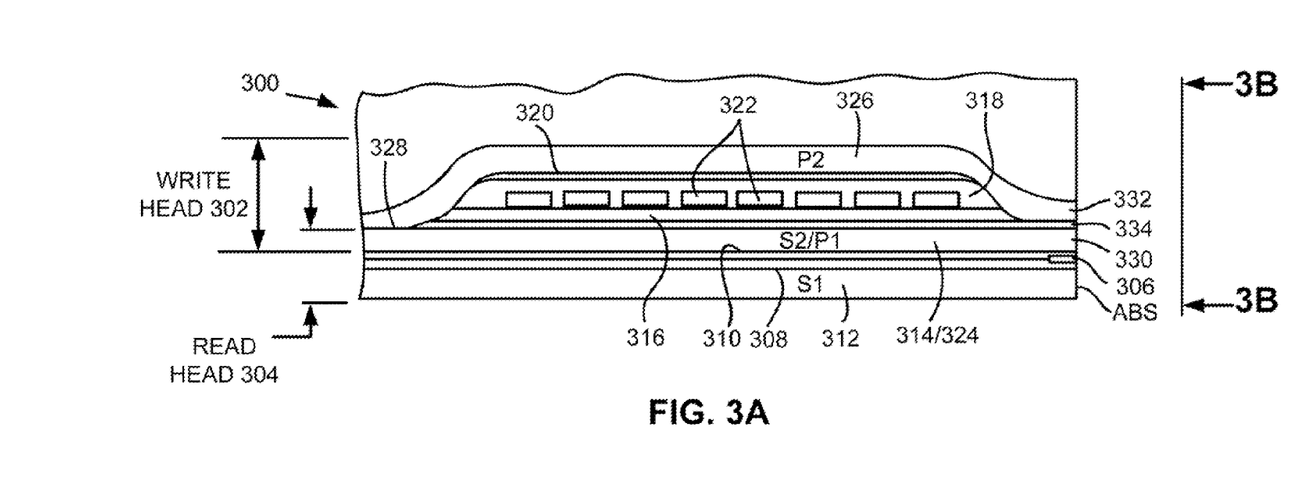
FIG. 3A is a partial view of a merged magnetic head.

FIG. 2A illustrates, schematically, a conventional recording medium such as used with conventional magnetic disc recording systems, such as that shown in FIG. 3A. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figures 2B, 2D, 2E:
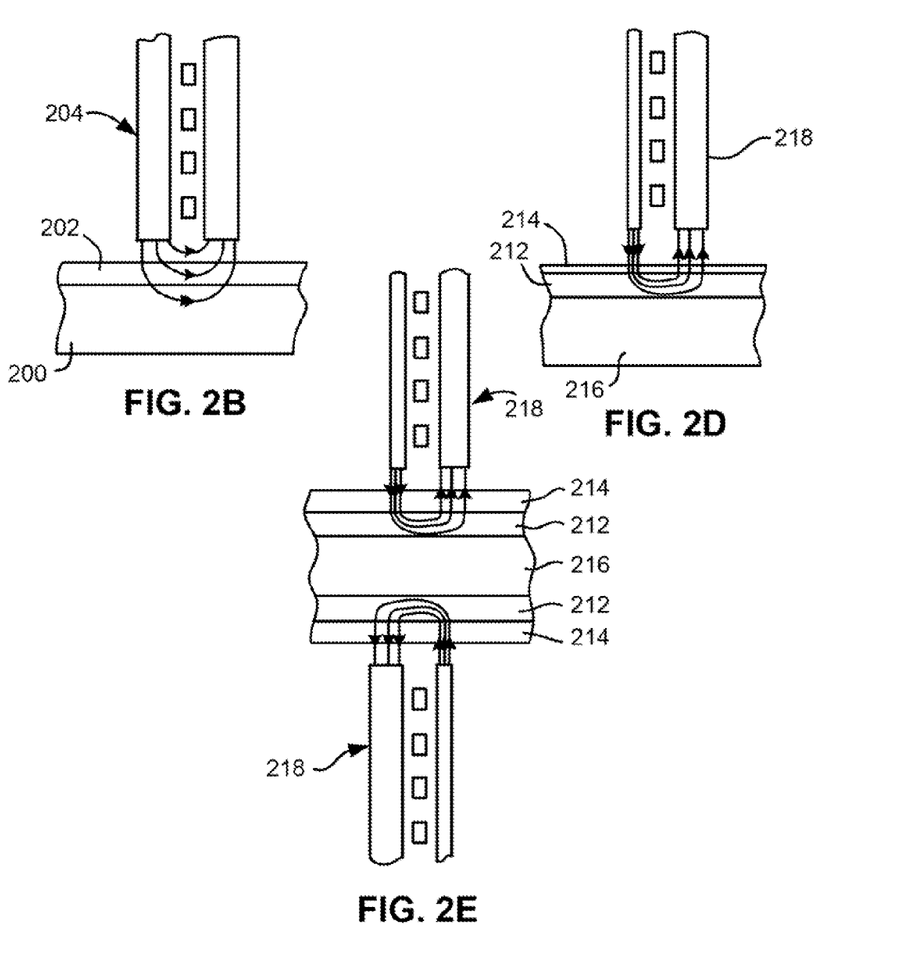
FIG. 2B is a schematic representation of a conventional magnetic recording head and recording medium combination for longitudinal recording as in FIG. 1.
FIG. 2D is a schematic representation of a recording head, and recording medium combination for perpendicular recording on one side.
FIG. 2E is a schematic representation of the recording apparatus, similar to that of FIG. 2O, but adapted for recording separately on both sides of the medium.

FIG. 2B shows the operative relationship between a conventional recording/playback head 204, which may preferably be a thin film head, and a conventional recording medium, such as that of FIG. 2A.

Figure 2C:
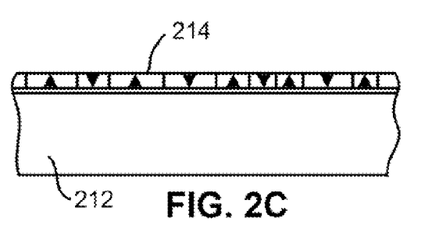
FIG. 2C is a magnetic recording medium utilizing a perpendicular recording format.

FIG. 2C illustrates schematically the orientation of magnetic impulses substantially perpendicular to the surface of the recording medium. For such perpendicular recording the medium includes an under layer 212 of a material having a high magnetic permeability. This under layer 212 is then provided with an overlying coating 214 of magnetic material preferably having a high coercivity relative to the under layer 212.

Two embodiments of storage systems with perpendicular heads 218 are illustrated in FIGS. 2C and 2D (not drawn to scale). The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium.

Figure 3B:
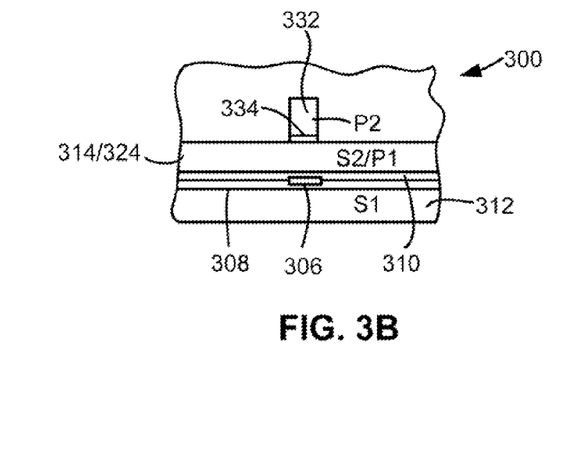
FIG. 3B is a partial air bearing surface (ABS) view, not to scale, of the slider taken along plane 3B-3B of FIG. 3A.

FIG. 3A is a side cross-sectional elevation view of a merged magnetic head 300, which includes a write head portion 302 and a read head portion 304, the read head portion employing a spin valve sensor 306. FIG. 3B is an ABS view of FIG. 3A. The spin valve sensor 306 is sandwiched between nonmagnetic electrically insulative first and second read gap layers 308 and 310, and the read gap layers are sandwiched between ferromagnetic first and second shield layers 312 and 314. In response to external magnetic fields, the resistance of the spin valve sensor 306 changes. A sense current ($I_s$) conducted through the sensor causes these resistance changes to be manifested as potential changes. These potential changes may then be processed as readback signals by processing circuitry (e.g. processing circuitry of the control unit 129 shown in FIG. 1).

The write head portion 302 of the magnetic head 300 includes a coil layer 322 sandwiched between first and second insulation layers 316 and 318. Note that the coils 322 are only partially shown, additional portions thereof being present outside the diagram. A third insulation layer 320 may be employed for planarizitig the head to eliminate ripples in the second insulation layer caused by the coil layer 322. The first, second and third insulation layers are referred to in the art as an "insulation stack".

The coil layer 322 and the first, second and third insulation layers 316, 318 and 320 are sandwiched between first and second pole piece layers 324 and 326. The first and second pole piece layers 324 and 326 are magnetically coupled at a back gap 328 and have first and second pole tips 330 and 332 which are separated by a write gap layer 334 at the ABS. Since the second shield layer 314 and the first pole piece layer 324 are a common layer this head is known as a merged head. In a piggyback head, an insulation layer is located between a second shield layer and a first pole piece layer. First and second solder connections (not shown) connect leads (not shown) from the spin valve sensor 306 to leads (not shown) on the slider 113 (FIG. 1), and third and fourth solder connections (not shown) connect leads (not shown) from the coil 322 to leads (not shown) on the suspension.

Perpendicular head technology gives significant higher data storage density than longitudinal heads. During the fabrication of such heads, writer dimension control is a key aspect to consider. One approach to main pole formation for perpendicular heads is to ion mill through a hardmask into a laminate film. This technique is most effective when used with a high milling resistant material for track width control and bevel angle control. However, the use of diamond-like carbon (DLC) as a hardmask has heretofore been limited by the susceptibility of DLC to crack at thicknesses of 300 angstroms and higher. Because of the low thickness, DLC has generally not been useable as a hardmask for extended milling operations. Accordingly, softer materials that can be formed to greater thicknesses are typically used. However, these softer materials tend to erode quickly on ail sides thereof, resulting in rounded corners adjacent the interface of the soft material and the layer being patterned. Such rounded corners are particularly undesirable for magnetic recording pole tips, where a bevel and sharp corners are preferred for best magnetic bit definition.

Figure 4:
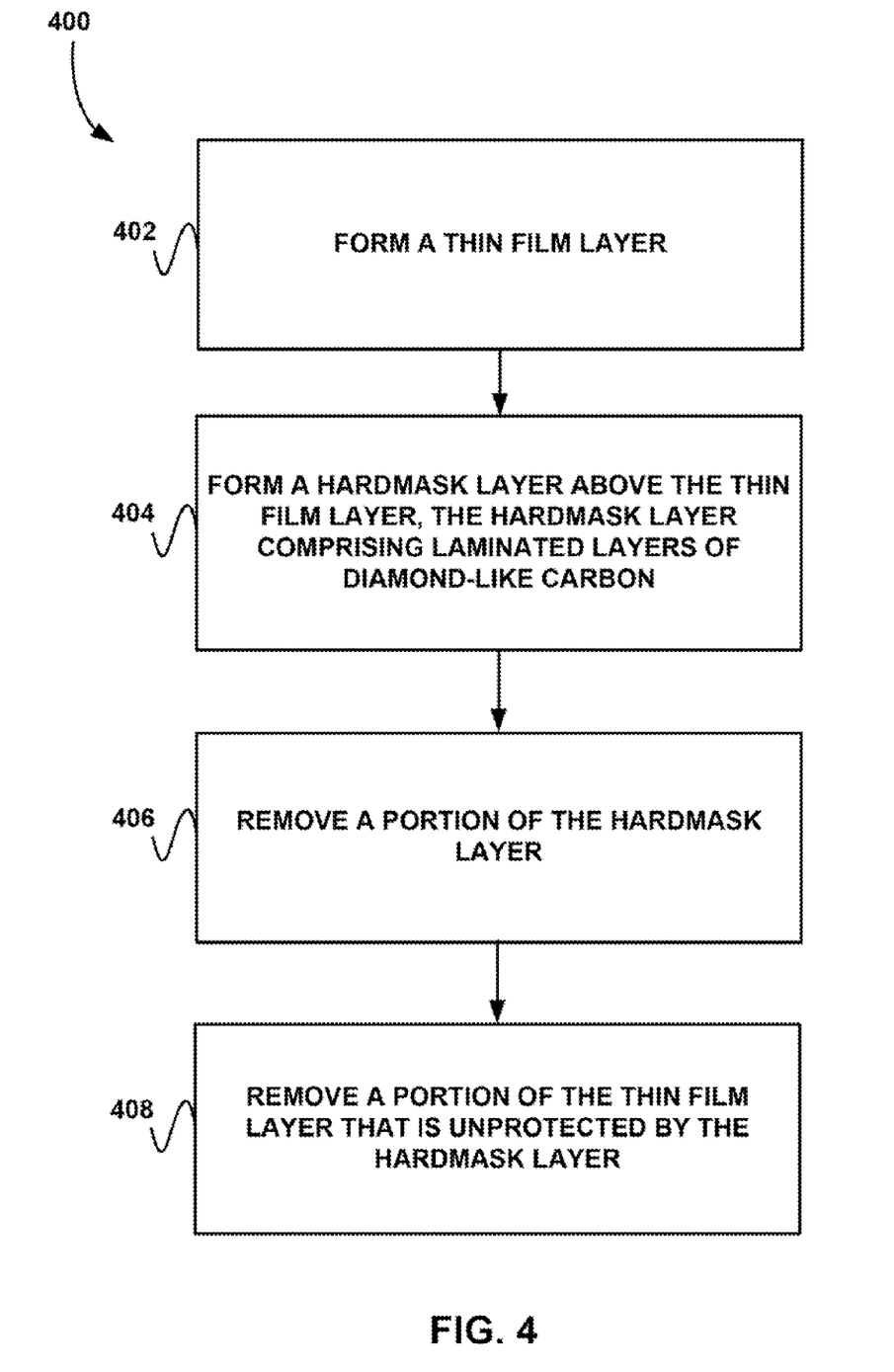
FIG. 4 shows a method for fabricating a magnetic structure using a diamond-like carbon (DLC) hardmask, in accordance with one embodiment.

FIG. 4 shows a method 400 for fabricating a magnetic structure using a DLC hardmask, in accordance with one embodiment. As shown, a thin film layer is formed. See operation 402. Additionally, a hardmask layer is formed above the thin film layer, the hardmask layer comprising laminated layers of diamond-like carbon. See operation 404. As an option, the hardmask may include adhesion layers between the layers of diamond-like carbon. Furthermore, in one embodiment, the hardmask layer may be a patterned hardmask layer.

The thickness of the hardmask may differ in the various embodiments. For example, in one embodiment, a thickness of the hardmask in a direction perpendicular to a plane of formation thereof may be greater than about 300 angstroms. In another embodiment, the thickness of the hardmask in a direction perpendicular to a plane of formation thereof may be greater than about 1000 angstroms. In still another embodiment, the thickness of the hardmask in a direction perpendicular to a plane of formation thereof may be between about 300 and about 2000 angstroms. Of course, in other embodiments, the thickness of the hardmask in a direction perpendicular to a plane of formation may be any value (e.g. greater than about 400 angstroms, 500 angstroms, 600 angstroms, 700 angstroms, etc.).

As further shown in FIG. 4, a portion of the hardmask layer is removed. See operation 406. In one embodiment, removing the portion of the hardmask layer may include forming a patterned protective layer above the hardmask layer, and performing a fluorine-based reactive ion etching on exposed portions of the hardmask layer. In another embodiment, removing the portion of the hardmask layer may include forming a patterned protective layer above the hardmask layer, and performing an oxygen-based ion milling on exposed portions of the hardmask layer.

Still yet, a portion of the thin film layer that is unprotected by the hardmask layer is removed. See operation 408. Hie portion of the thin film layer may be partially or fully removed using any number of techniques. For example, the portion of the thin film layer may be removed by etching [e.g. reactive ion etching (RIE), etc.] or by milling (e.g., ion milling, e-beam milling, etc.).

In one embodiment, the hardmask may be formed directly on the thin film layer. For example, the thin film layer may include a magnetic material, and the hardmask may be formed directly on the thin film layer. In this case, after removing the unprotected portion of the thin film layer, the hard mask layer may be removed. In other embodiments, a portion of the hard mask layer may remain.

In another embodiment, after removing the unprotected portion of the thin film layer, a layer of insulating material may be formed over and along sides of the thin film layer, e.g., by atomic layer deposition, full film deposition, sputtering, spin-on coating, etc. In this case, after forming the layer of insulating material, a portion of the insulating material may be removed for exposing the hardmask layer, and removing the hardmask layer.

As an option, removing the portion of the thin film layer may be performed at angles such that sidewalk of a remaining portion of the thin film layer taper together at an end thereof away from the hardmask layer. In this case, an angle of taper relative to a plane of deposition of the thin film layer may be any suitable angle. For example, an angle of taper relative to a plane of deposition of the thin film layer may be greater than about 60 degrees, about 70 degrees, about 80 degrees, etc. In this way, the hardmask layer may be utilized to achieve narrow track width and bevel angle control.

Further, it has been found that by using the laminated DLC hardmask layer described herein, the corners of the thin film layer adjacent the hardmask remain relatively sharp.

Figure 5:
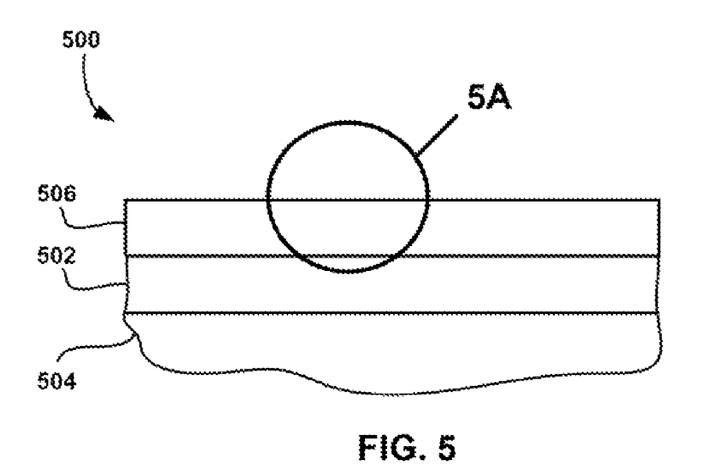
FIG. 5A is an ABS view of a magnetic structure, not to scale, being formed in accordance with one embodiment.
FIG. 5B is a detailed view taken from Circle 5B of FIG. 5A.
Figure 5A:
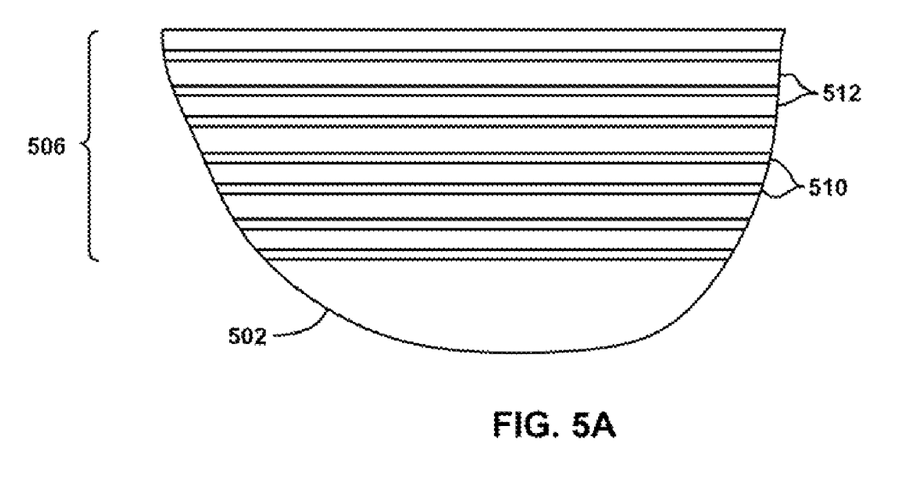

FIG. 5A is an ABS view of a structure 500 formed during a process for forming a magnetic structure such as a perpendicular pole tip, in accordance with one embodiment. For clarity and ease of understanding, the following description shall refer to creation of a pole tip, it being understood by one skilled in the art that the processes can be adapted with little or no modification to form magnetic structures for various uses. It is also assumed that one can form additional poles and coil layers at different points in the process.

As shown in FIG. 5A a magnetic pole tip layer 502 is formed on a layer of nonmagnetic material 504 such as $Al_2O_3$. The pole tip layer 502 may be formed of any suitable magnetic material including NiFe, CoFe, laminates, etc.

As shown further, a DLC hardmask 506 is formed on the pole tip layer 502. The DLC hardmask 506 is formed of laminated layers of diamond-like carbon, and may include adhesion layers (e.g. Si or Ti layers, etc.) between the layers of diamond-like carbon. For example, as shown in FIG. 5B, adhesion layers 510 may be located between DLC layers 512. Illustrative thicknesses of the DLC layers 512 are between about 5 and about 30 nm. Illustrative thicknesses of the adhesion layers 510 are between about 1 and about 5 nm. The number of laminates may be any desired number per the desires of the user and/or requirements of the process to be performed.

Figure 6:
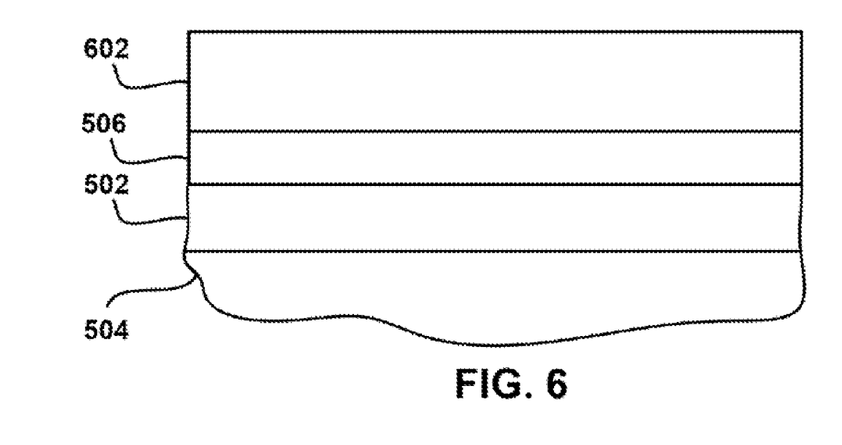
FIG. 6 is an ABS view of the magnetic structure of FIG. 5A, not to scale, upon further processing.

As depicted in FIG. 6, a layer of a polyimide precursor polymer 602 may be spun onto the structure of FIG. 5A. One potential polyimide precursor polymer is DURIMIDE®, sold by Arch Chemicals Inc., 501 Merritt 7, P.O. Box 5204, Norwalk, Conn., 06856-5204, USA, though any type may be used. Note also that instead of a polyimide precursor polymer, other material that upon curing (e.g., baking) forms a material that is polyimide-like may also be used. For clarity, the remaining discussion shall refer to a polyimide precursor polymer, it being understood that this term includes polymers capable of forming polyimides and polyimide-like materials. The polyimide precursor polymer 602 may be hard baked to cure the polymer 602, forming the polyimide or polyimide-like material.

Figure 7:
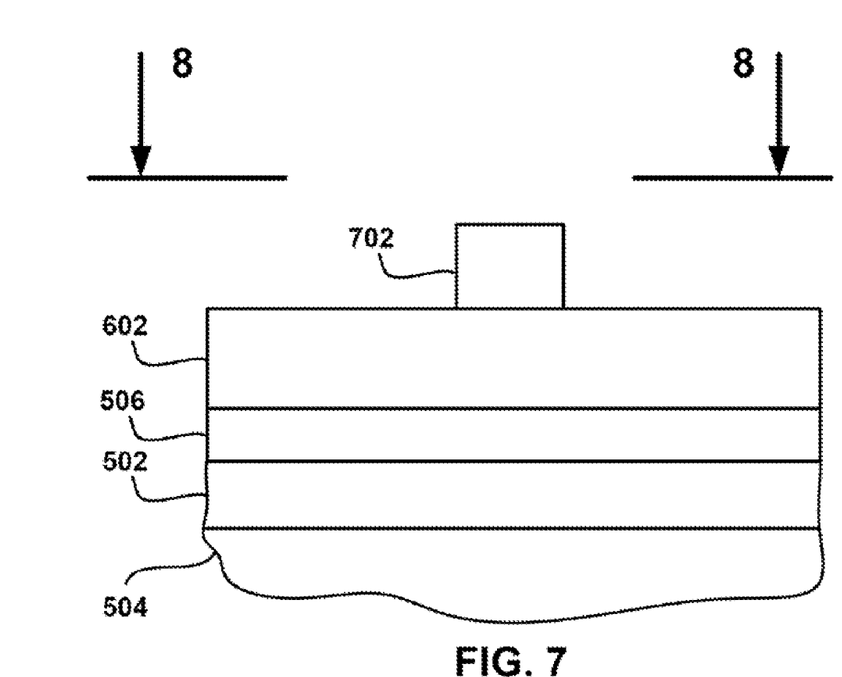
FIG. 7 is an ABS view of the magnetic structure of FIG. 6, not to scale, upon further processing.

Referring to FIG. 7, to form the desired shape of the cured polyimide precursor polymer 602, a silicon-containing resist layer 702 may be added and patterned to allow patterning of the cured polyimide precursor polymer 602. Photo-exposable or electron beam exposable Si-containing resists may be used. One potential Si-containing resist is an e-beam resist such as hydrogen silsesquioxane (HSQ), sold by Dow Corning Corporation, Corporate Center, PO box 994, Midland, Mich., 48686-0994, USA, Note however, that any type of resist may be used.

Figure 8:
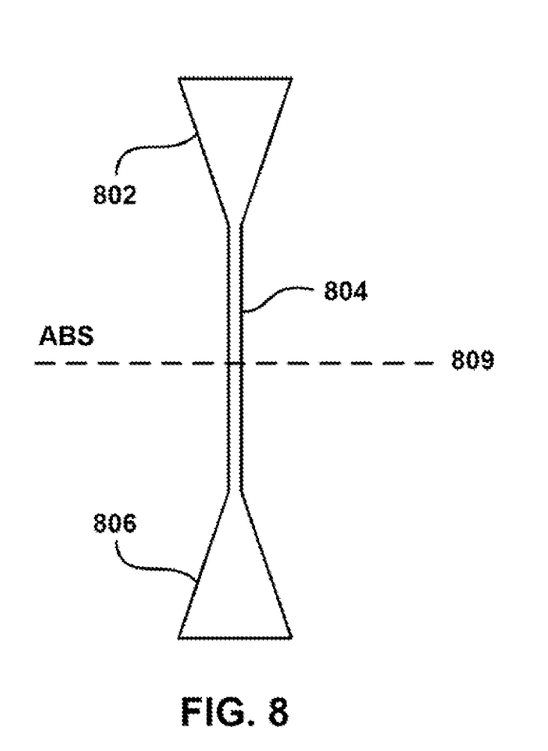
FIG. 8 is a top down depiction of the structure of FIG. 7.

FIG. 8 is a top down depiction of the structure of FIG. 7. As shown, the e-beam exposes an anchor pad 802, a line (pole) 804, and another anchor pad 806. The anchor pads 802, 806 may add stability to the pole 804 so that it is less likely to tip over during subsequent processing. In addition, the exposed surface (i.e., ABS) of the slider 809 may coincide with the pole.

Figure 9:
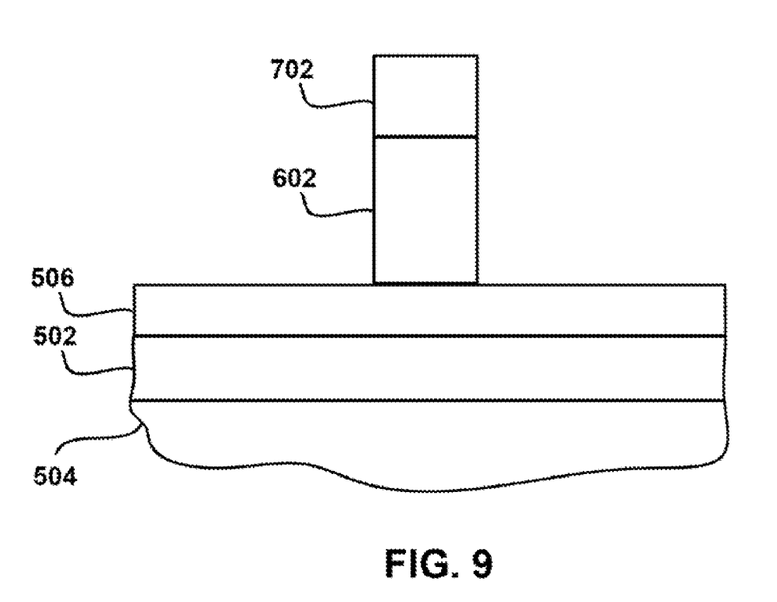
FIG. 9 is an ABS view of the magnetic structure of FIG. 7, not to scale, upon further processing.

The Si-containing resist 702 may be exposed to an oxygen plasma, which converts the resist 702 to a material that is like glass, e.g., SiOx. The SiOx mask may then be used as a hard mask to RIE with an oxygen-containing plasma (e.g., $CO_2$ plasma) to form the polyimide stack, as shown in FIG. 9. In general terms, the resulting structure is a patterned polyimide layer and a Si-containing mask on top of a polyimide layer.

Figure 10:
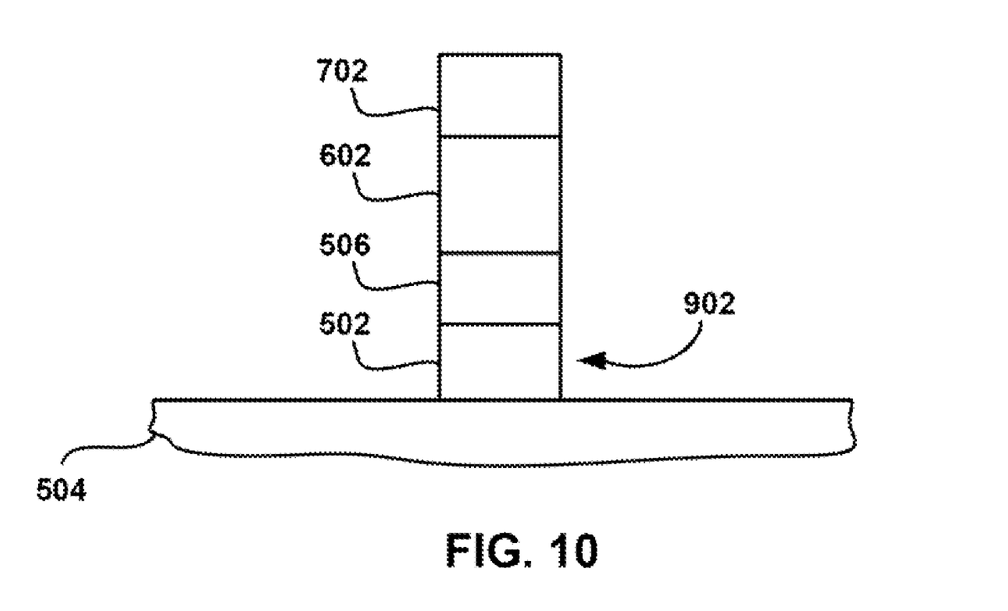
FIG. 10 is an ABS view of the magnetic structure of FIG. 9, not to scale, upon further processing.

The structure of FIG. 9 may then be milled, such as by ion beam milling or other techniques (e.g. $CF_4/O_2$ RIE or Ar/O RIE), to remove the exposed portions of the pole tip layer 502 and the DLC hardmask 506 thereby forming the pole tip 902. The resulting structure is shown in FIG. 10. Although the structure in FIG. 10 illustrates the resist 702 and the cured polyimide precursor polymer 602, the ion beam milling or other techniques may have removed all or a substantial portion of such layers. Additionally, subsequent processing may optionally be used to remove any remaining resist 702 and/or cured polyimide precursor polymer 602.

Figure 11:
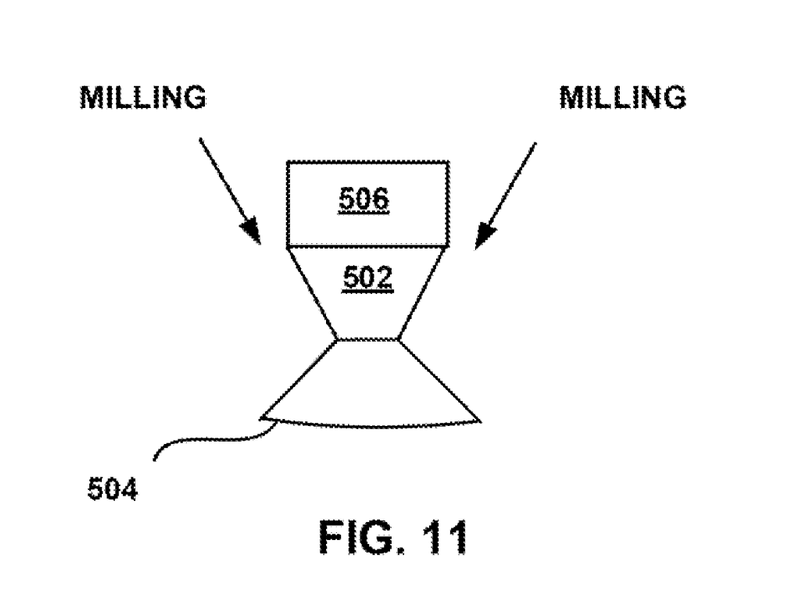
FIG. 11 is an ABS view of the magnetic structure of FIG. 10, not to scale, upon further processing.

The structure of FIG. 10 may then be milled, such as by ion beam milling (e.g. Ar ion milling), removing a portion of the pole tip layer 502 at an angle (e.g. about 70-89 degrees, etc.) on each side such that sidewalks of a remaining portion of the pole tip layer 502 taper together at an end thereof away from the DLC hardmask 506, resulting in the structure shown in FIG. 11. In this way, the DLC hardmask 506 may be used to eliminate the rounding of edges of the pole tip layer 502 near the interface with the DLC hardmask 506 during the ion beam milling process.

Figure 12:
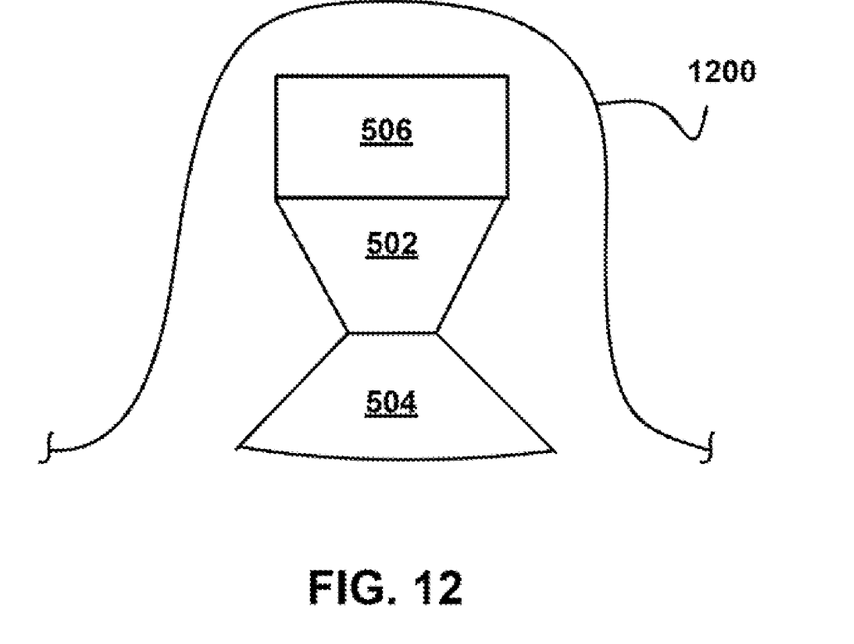
FIG. 12 is an ABS view of the magnetic structure of FIG. 11, not to scale, upon further processing.

Subsequent to the ion beam milling, the remaining DLC hardmask 506 may be removed from the structure of FIG. 11. For example, in one embodiment, a layer of insulating material 1200 may be formed over and along sides of the pole tip layer 502, e.g., by atomic layer deposition, as shown in FIG. 12. In one embodiment, the layer of insulating material 1200 may include $Al_2O_3$.

Figure 13:
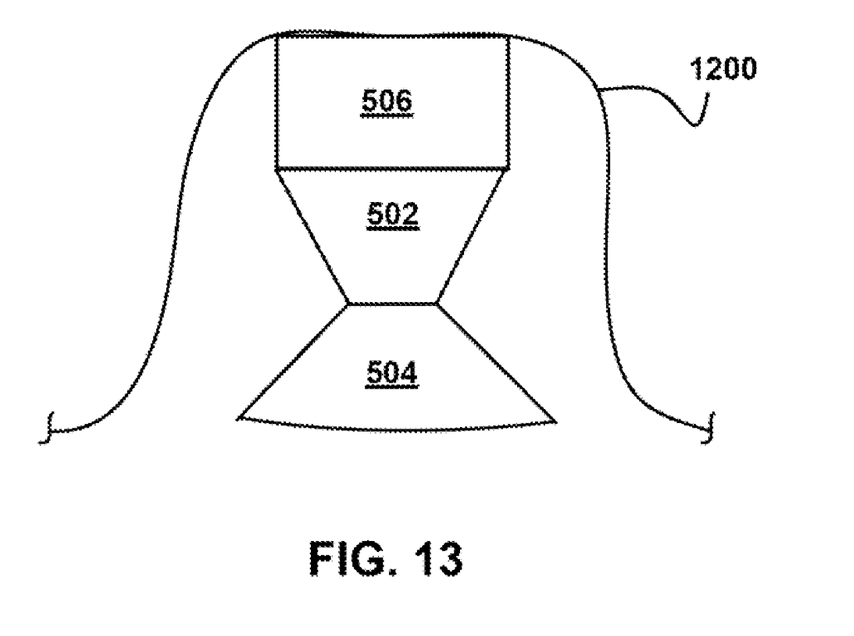
FIG. 13 is an ABS view of the magnetic structure of FIG. 12, not to scale, upon further processing.

After forming the layer of insulating material 1200, a portion of the insulating material may then be removed for exposing the DLC hardmask 506, as shown in FIG. 13. The top portion of the insulating material 1200 may be removed by ion milling, which may tend to selectively remove the top portion of the insulating material 1200. This will provide a process to achieve a thin top shield gap for a trailing shield perpendicular writer.

Figure 14:
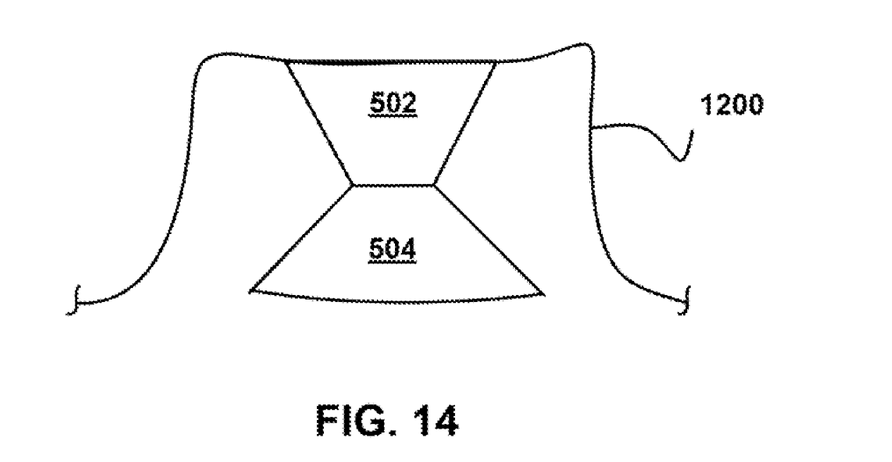
FIG. 14 is an ABS view of the magnetic structure of FIG. 13, not to scale, upon further processing.

The DLC hardmask 506 may then be removed (e.g. using $CF_4/O_2$ RIE or Ar/O RIE), resulting in the structure shown in FIG. 14. In this way, the pole tip layer 502 will be exposed leaving a portion of the insulating material 1200, which may optionally serve as a side shield gap for a wrap around shield in a perpendicular writer. Furthermore, a layer may be deposited on top of the exposed portion of the pole tip layer 502. Preferably, the layer is of a nonmagnetic material. For example, such layer may include Ir, Ru, Rh, or any other suitable nonmagnetic material. A magnetic wrap around shield may be electrically plated over the structure in FIG. 14.

Figure 15:
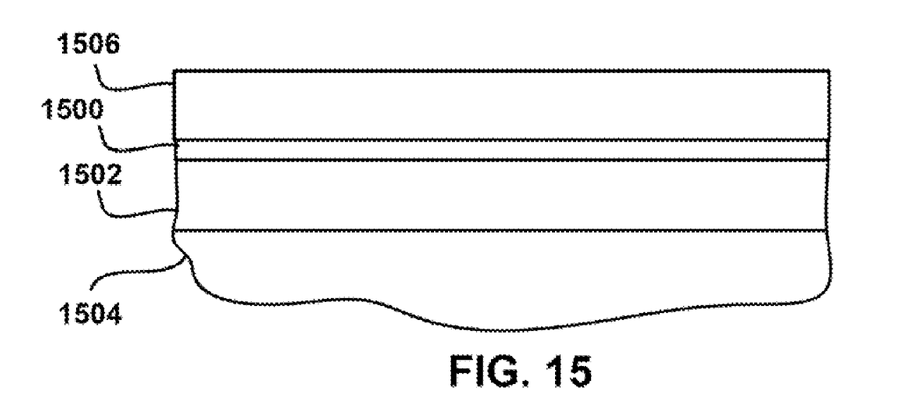
FIG. 15 is an ABS view of a magnetic structure, not to scale, being formed according to another embodiment.

Note that in the above process, as well as in the subsequently discussed processes, additional layers may be added to the structures if desired. For example, FIG. 15 shows one embodiment where a thin film layer 1502 (e.g. a magnetic pole tip layer, etc.) is formed on a substrate 1504 and a hardmask layer 1506 (e.g. a DLC hardmask) is formed above the thin film layer 1502. A layer of material 1500 may be interposed between the thin film layer 1502 and the DLC hardmask 1506, such material 1500 may be an oxide such as alumina, a metal (e.g. NiCr, Ru, Ir, etc.), etc.

In this way, the material 1500 may function as a stop layer, seed layer, etc. For example, the material 1500 may be utilized to avoid damage to the thin film layer 1502 during processing. It should be noted that the thickness of the material 1500 may vary in different embodiments. For example, in one embodiment, the thickness of the material 1500 may be 10 nm. In various other embodiments, the thickness of the material 1500 may vary from 5-100 nm. Of course, these are only examples as any thickness may be utilized depending on the application.

It should be noted that the structures shown in FIG. 15 may each be processed further as described in the context of FIGS. 6-14. Further, with reference to FIGS. 5A, 5B, and 6-16, it should be noted that the width of the layers shown in the corresponding structures may be any suitable width. For example, in one embodiment, the thickness of the pole tip layer 502 may be about 200 nm, the thickness of the DLC hardmask 506 may be about 200 nm, the thickness of the polyimide precursor polymer 602 may be about 1 micron, and the thickness of the resist 702 may be about 250-400 nm. Furthermore, in the case that the DLC layer 502 includes adhesion layers (e.g. Si layers, etc.) between the layers of diamond-like carbon, the DLC layer 502 may be formed by depositing 1-40 nm of DLC followed by about 1 to 10 nm of an adhesion layer. Of course, these are only exemplary thickness, and any suitable layer thickness may be utilized, depending on the application and/or the material used.

As an option in any embodiment, a material (e.g. oxygen, a metal, etc.) may be implanted into a portion of the thin film layer that is unprotected by the patterned hardmask layer.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    forming a thin film layer;
    forming a hardmask layer above the thin film layer, the hardmask layer comprising laminated layers of diamond-like carbon;
    removing a portion of the hardmask layer; and
    removing a portion of the thin film layer that is unprotected by the hardmask layer,
    wherein the thin film layer comprises a magnetic material, wherein the hardmask is formed directly on the thin film layer.

2. A method as recited in claim 1, wherein a thickness of the hardmask in a direction perpendicular to a plane of formation thereof is greater than about 300 angstroms.

3. A method as recited in claim 1, wherein a thickness of the hardmask in a direction perpendicular to a plane of formation thereof is greater than about 1000 angstroms.

4. A method as recited in claim 1, wherein a thickness of the hardmask in a direction perpendicular to a plane of formation thereof is between about 300 and about 2000 angstroms.

5. A method as recited in claim 1, further comprising, after removing the unprotected portion of the thin film layer, removing the hard mask layer.

6. A method as recited in claim 1, wherein the portion of the thin film layer is removed by etching.

7. A method as recited in claim 1, wherein the portion of the thin film layer is removed by milling.

8. A method as recited in claim 1, wherein the hardmask includes adhesion layers between the layers of diamond-like carbon.

9. A method as recited in claim 1, further comprising, after removing the unprotected portion of the thin film layer, forming a layer of insulating material over and along sides of the thin film layer by atomic layer deposition.

10. A method as recited in claim 9, further comprising, after forming the layer of insulating material, removing a portion of the insulating material for exposing the hardmask layer, and removing the hardmask layer.

11. A method as recited in claim 1, wherein removing the portion of the thin film layer is performed at angles such that sidewalls of a remaining portion of the thin film layer taper together at an end thereof away from the hardmask layer.

12. A method as recited in claim 11, wherein an angle of taper relative to a plane of deposition of the thin film layer is greater than about 70 degrees.

13. A method, comprising:
    forming a thin film layer;
    forming a hardmask layer above the thin film layer, the hardmask layer comprising laminated layers of diamond-like carbon;
    removing a portion of the hardmask layer; and
    removing a portion of the thin film layer that is unprotected by the hardmask layer,
    wherein removing the portion of the hardmask layer comprises forming a patterned protective layer above the hardmask layer, and performing a fluorine-based reactive ion etching on exposed portions of the hardmask layer.

14. A method, comprising:
    forming a thin film layer;
    forming a hardmask layer above the thin film layer, the hardmask layer comprising laminated layers of diamond-like carbon;
    removing a portion of the hardmask layer; and
    removing a portion of the thin film layer that is unprotected by the hardmask layer,
    wherein removing the portion of the hardmask layer comprises forming a patterned protective layer above the hardmask layer, and performing an oxygen-based ion milling on exposed portions of the hardmask layer.

15. A method, comprising:
    forming a thin film layer;
    forming a hardmask layer above the thin film layer, the hardmask layer comprising laminated layers of diamond-like carbon;
    removing a portion of the hardmask layer; and
    removing a portion of the thin film layer that is unprotected by the hardmask layer,
    wherein removing the portion of the thin film layer is performed at angles such that sidewalls of a remaining portion of the thin film layer taper together at an end thereof away from the hardmask layer.

16. A method as recited in claim 15, wherein an angle of taper relative to a plane of deposition of the thin film layer is greater than about 70 degrees.

17. A method, comprising:
forming a thin film layer;
forming a patterned hardmask layer above the thin film layer, the hardmask layer comprising laminated layers of diamond-like carbon; and
implanting a material into a portion of the thin film layer that is unprotected by the patterned hardmask layer,
wherein the thin film layer comprises a magnetic material, wherein the hardmask is formed directly on the thin film layer.

18. A method, comprising:
forming a thin film pole layer;
forming a patterned hardmask layer above the thin film layer, the hardmask layer comprising laminated layers of diamond-like carbon; and
removing a portion of the thin film pole layer that is unprotected by the hardmask layer for defining a pole such that sidewalls of a remaining portion of the thin film layer taper together at an end thereof away from the hardmask layer.

19. A method as recited in claim 18, wherein a thickness of the hardmask in a direction perpendicular to a plane of formation thereof is greater than about 300 angstroms.

20. A method as recited in claim 18, wherein an angle of taper relative to a plane of deposition of the thin film layer is greater than about 70 degrees.

21. A method as recited in claim 18, wherein the hardmask includes adhesion layers between the layers of diamond-like carbon.

22. A method as recited in claim 18, further comprising, after removing the unprotected portion of the thin film layer, forming a layer of insulating material over and along sides of the thin film layer by atomic layer deposition.

23. A method as recited in claim 22, further comprising using ion milling to remove a top portion of the insulating material, while minimizing removal of the insulating material along the sides of the thin film layer.

24. A method, comprising:
forming a thin film pole layer;
forming a patterned hardmask layer above the thin film layer, the hardmask layer comprising laminated layers of diamond-like carbon;
removing a portion of the thin film pole layer that is unprotected by the hardmask layer for defining a pole such that sidewalls of a remaining portion of the thin film layer taper together at an end thereof away from the hardmask layer, wherein an angle of taper relative to a plane of deposition of the thin film layer is greater than about 70 degrees; and
removing the hard mask layer.

* * * * *

UNITED STATES PATENT AND TRADEMARK OFFICE
CERTIFICATE OF CORRECTION

PATENT NO. : 8,088,295 B2  
APPLICATION NO. : 12/018084  
DATED : January 3, 2012  
INVENTOR(S) : Yi Zheng Page 1 of 1

It is certified that error appears in the above-identified patent and that said Letters Patent is hereby corrected as shown below:

In the Drawings  
On sheet 5 of the drawings, in the upper drawing, change "5A" to --5B--.  
On sheet 5 of the drawings, in the upper drawing, change "FIG. 5" to --FIG. 5A--.  
On sheet 5 of the drawings, in the lower drawing, change "FIG. 5A" to --FIG. 5B--.

Signed and Sealed this  
Third Day of April, 2012

David J. Kappos  
*Director of the United States Patent and Trademark Office*